(12) United States Patent
Hanazaki et al.

(10) Patent No.: US 10,749,167 B2
(45) Date of Patent: Aug. 18, 2020

(54) LITHIUM ION SECONDARY BATTERY AND METHOD OF MANUFACTURING THE SAME

(71) Applicant: TOYOTA JIDOSHA KABUSHIKI KAISHA, Toyota-shi, Aichi-ken (JP)

(72) Inventors: Ryo Hanazaki, Toyota (JP); Keiichi Takahashi, Nishinomiya (JP); Naoyuki Wada, Hirakata (JP); Yukihiro Okada, Shijyonawate (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 172 days.

(21) Appl. No.: 16/010,644

(22) Filed: Jun. 18, 2018

(65) Prior Publication Data

US 2019/0036110 A1    Jan. 31, 2019

(30) Foreign Application Priority Data

Jul. 31, 2017  (JP) .................. 2017-147916

(51) Int. Cl.
*H01M 4/36* (2006.01)
*H01M 4/505* (2010.01)
*H01M 4/525* (2010.01)
*H01M 10/0525* (2010.01)
(Continued)

(52) U.S. Cl.
CPC .......... *H01M 4/364* (2013.01); *H01M 4/505* (2013.01); *H01M 4/525* (2013.01); *H01M 10/058* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| | | |
|---|---|---|
| 2010/0310934 A1 | 12/2010 | Yang et al. |
| 2015/0349329 A1 | 12/2015 | Saka et al. |
| 2016/0248085 A1 | 8/2016 | Umeyama et al. |

FOREIGN PATENT DOCUMENTS

| | | |
|---|---|---|
| JP | 2006-332020 A | 12/2006 |
| JP | 2007-265668 A | 10/2007 |
| JP | 2007-273224 A | 10/2007 |

(Continued)

OTHER PUBLICATIONS

Machine translation of Morita et a. JP 2013131322A (Year: 2013).*

(Continued)

*Primary Examiner* — Wojciech Haske
(74) *Attorney, Agent, or Firm* — Sughrue Mion, PLLC (57) ABSTRACT

A lithium ion secondary battery includes at least a positive electrode, a negative electrode, and an electrolyte. The positive electrode contains at least a first positive electrode active material and a second positive electrode active material. The first positive electrode active material is expressed with a formula (I) $LiNi_aCo_bMn_cO_2$ and the second positive electrode active material is expressed with a formula (II) $LiNi_dCo_eMn_fO_2$, where a, b, c, d, e, and f satisfy conditions of $a>d$, $0.4 \leq a \leq 0.6$, $0.2 \leq b \leq 0.5$, $0.1 \leq c \leq 0.2$, $a+b+c=1.0$, $0.2 \leq d \leq 0.5$, $0.1 \leq e \leq 0.2$, $0.4 \leq f \leq 0.6$, and $d+e+f=1$.

10 Claims, 2 Drawing Sheets

(51) Int. Cl.
*H01M 10/058* (2010.01)
*H01M 4/02* (2006.01)

(56) References Cited

FOREIGN PATENT DOCUMENTS

| | | | |
|---|---|---|---|
| JP | 2007-531216 A | | 11/2007 |
| JP | 2008-293988 A | | 12/2008 |
| JP | 2010-067365 A | | 3/2010 |
| JP | 2012-243463 A | | 12/2012 |
| JP | 2013131322 A | * | 7/2013 |
| JP | 2015-153535 A | | 8/2015 |
| JP | 2015-228282 A | | 12/2015 |
| JP | 2016-058309 A | | 4/2016 |
| JP | 2016-154100 A | | 8/2016 |
| KR | 10-2010-0131252 A | | 12/2010 |
| WO | 2006/004279 A1 | | 1/2006 |
| WO | 2016/038440 A1 | | 3/2016 |

OTHER PUBLICATIONS

Requirement for Restriction/Election dated Feb. 26, 2019, from the U.S. Patent and Trademark Office in U.S. Appl. No. 15/676,416.
Notice of Allowance dated Apr. 3, 2019, from the U.S. Patent and Trademark Office in U.S. Appl. No. 15/676,416.
Corrected Notice of Allowance dated May 21, 2019, from the U.S. Patent and Trademark Office in U.S. Appl. No. 15/676,416.

* cited by examiner

FIG.1

LITHIUM ION SECONDARY BATTERY AND METHOD OF MANUFACTURING THE SAME

This nonprovisional application is based on Japanese Patent Application No. 2017-147916 filed with the Japan Patent Office on Jul. 31, 2017, the entire contents of which are hereby incorporated by reference.

BACKGROUND

Field

The present disclosure relates to a lithium ion secondary battery and a method of manufacturing the same.

Description of the Background Art

Japanese Patent Laying-Open No. 2007-273224 discloses use of a mixture of $LiCoO_2$ and $LiNi_{1/3}Co_{1/3}Mn_{1/3}O_2$ for a positive electrode.

SUMMARY

According to Japanese Patent Laying-Open No. 2007-273224, combination of the positive electrode above and a silicon-based negative electrode provides a lithium ion secondary battery (which may hereinafter be abbreviated as a "battery") high in volume capacity density even though a range of working voltages thereof is narrow. Japanese Patent Laying-Open No. 2007-273224 has not studied battery output in an environment at an extremely low temperature (which may hereinafter be abbreviated as an "extremely-low-temperature output").

An object of the present disclosure is to improve extremely-low-temperature output.

[1] A lithium ion secondary battery includes at least a positive electrode, a negative electrode, and an electrolyte. The positive electrode contains at least a first positive electrode active material and a second positive electrode active material. The first positive electrode active material is expressed with a formula (I):

$LiNi_aCo_bMn_cO_2$ (I) and the second positive electrode active material is expressed with a formula (II):

$LiNi_dCo_eMn_fO_2$ (II), where a, b, c, d, e, and f satisfy conditions of a>d, 0.4≤a≤0.6, 0.2≤b≤0.5, 0.1≤c≤0.2, and a+b+c=1.0, and 0.2≤d≤0.5, 0.1≤e≤0.2, 0.4≤f≤0.6, and d+e+f=1.

According to novel findings in the present disclosure, although a mechanism is unclear, owing to coexistence of two types of positive electrode active materials in the positive electrode, improvement in extremely-low-temperature output is expected. A "low temperature" herein refers to a temperature from 0° C. to −30° C. and an "extremely low temperature" refers to a temperature further lower than −30° C. (for example, approximately −35° C.)

[2] The electrolyte may include an electrolyte solution. The first positive electrode active material has a first oil absorption number. The second positive electrode active material has a second oil absorption number. The second oil absorption number may be greater than the first absorption number.

An $LiNiCoMnO_2$-based positive electrode active material tends to be lower in thermal stability as a composition ratio of nickel (Ni) is higher. The $LiNiCoMnO_2$-based positive electrode active material tends to have improved thermal stability as a composition ratio of manganese (Mn) is higher. The "positive electrode active material being low in thermal stability" means that a temperature at which decomposition reaction of the positive electrode active material starts is low. The "positive electrode active material being high in thermal stability" means that a temperature at which decomposition reaction of the positive electrode active material starts is high. As a result of decomposition reaction of the positive electrode active material, oxygen can be emitted. It is thus assumed that oxidation reaction of an electrolyte solution is promoted and heat is generated.

In the formulae (I) and (II), relation of "a>d" is satisfied in connection with a composition ratio of Ni. In the formulae (I) and (II), relation of "c<f" is also satisfied in connection with a composition ratio of Mn. Therefore, it is expected that the second positive electrode active material is relatively higher in thermal stability than the first positive electrode active material.

An oil absorption number of the positive electrode active material is an indicator which indicates how much electrolyte solution can exist around the positive electrode active material in the battery. According to the feature in [2], it is assumed that the electrolyte solution may be distributed unevenly around the second positive electrode active material relatively high in thermal stability in the positive electrode. Therefore, suppression of oxidation reaction (heat generation reaction) of the electrolyte solution is expected. According to the feature in [2], improvement in thermal stability of the battery is expected.

[3] A ratio of the second oil absorption number to the first oil absorption number may be not lower than 1.1 and not higher than 2.1. A ratio of the second oil absorption number to the first oil absorption number is herein also denoted as an "oil absorption number ratio." With the oil absorption number ratio being not lower than 1.1, improvement in thermal stability of the battery is expected. With the oil absorption number ratio being not higher than 2.1, improvement in cycling performance of the battery is expected.

[4] The first positive electrode active material may be $LiNi_{0.6}Co_{0.2}Mn_{0.2}O_2$ or $LiNi_{0.4}Co_{0.5}Mn_{0.1}O_2$. The second positive electrode active material may be $LiNi_{0.2}Co_{0.2}Mn_{0.6}O_2$, $LiNi_{0.4}Co_{0.1}Mn_{0.5}O_2$, or $LiNi_{0.5}Co_{0.1}Mn_{0.4}O_2$.

[5] The first positive electrode active material and the second positive electrode active material may satisfy relation in mass ratio of the first positive electrode active material:the second positive electrode active material=20:80 to 60:40. With 20 mass % or more of the first positive electrode active material (Ni rich) with respect to a total of the first positive electrode active material and the second positive electrode active material, improvement in extremely-low-temperature output is expected. With 40 mass % or more of the second positive electrode active material (Mn rich) with respect to the total of the first positive electrode active material and the second positive electrode active material, improvement in thermal stability and improvement in cycling performance are expected.

[6] A method of manufacturing a lithium ion secondary battery includes (A) and (D) below:

(A) manufacturing a positive electrode; and (D) manufacturing a lithium ion secondary battery including at least the positive electrode, a negative electrode, and an electrolyte. The positive electrode is manufactured to contain at least a first positive electrode active material and a second positive electrode active material. The first positive electrode active material is expressed with a formula (I):

$LiNi_aCo_bMn_cO_2$ (I) and the second positive electrode active material is expressed with a formula (II):

$$\text{LiNi}_d\text{Co}_e\text{Mn}_f\text{O}_2 \quad \text{(II), where a, b, c, d, e, and f satisfy conditions of}$$

a>d,
$0.4 \leq a \leq 0.6$, $0.2 \leq b \leq 0.5$, $0.1 \leq c \leq 0.2$, and $a+b+c=1.0$, and
$0.2 \leq d \leq 0.5$, $0.1 \leq e \leq 0.2$, $0.4 \leq f \leq 0.6$, and $d+e+f=1$. According to this manufacturing method, improvement in extremely-low-temperature output is expected.

[7] In [6], the electrolyte may include an electrolyte solution. The first positive electrode active material has a first oil absorption number. The second positive electrode active material has a second oil absorption number. The second oil absorption number may be greater than the first oil absorption number. According to this manufacturing method, improvement in thermal stability of the battery is expected.

[8] In [7], a ratio of the second oil absorption number to the first oil absorption number may be not lower than 1.1 and not higher than 2.1 According to this manufacturing method, improvement in thermal stability of the battery is expected. In addition, according to this manufacturing method, improvement in cycling performance of the battery is also expected.

[9] In any one of [6] to [8], the first positive electrode active material may be $\text{LiNi}_{0.6}\text{Co}_{0.2}\text{Mn}_{0.2}\text{O}_2$ or $\text{LiNi}_{0.4}\text{CO}_{0.5}\text{Mn}_{0.1}\text{O}_2$. The second positive electrode active material may be $\text{LiNi}_{0.2}\text{Co}_{0.2}\text{Mn}_{0.6}\text{O}_2$, $\text{LiNi}_{0.4}\text{Co}_{0.1}\text{Mn}_{0.5}\text{O}_2$, or $\text{LiNi}_{0.5}\text{Co}_{0.1}\text{Mn}_{0.4}\text{O}_2$.

[10] In any one of [6] to [9], the first positive electrode active material and the second positive electrode active material may satisfy relation in mass ratio of the first positive electrode active material:the second positive electrode active material 20:80 to 60:40. According to this manufacturing method, improvement in extremely-low-temperature output is expected. In addition, according to this manufacturing method, improvement in thermal stability and improvement in cycling performance are expected.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

An embodiment of the present disclosure (which is herein also denoted as the "present embodiment") will be described below. The description below, however, does not limit the scope of claims for patent.

<Lithium Ion Secondary Battery>

Figure 1:
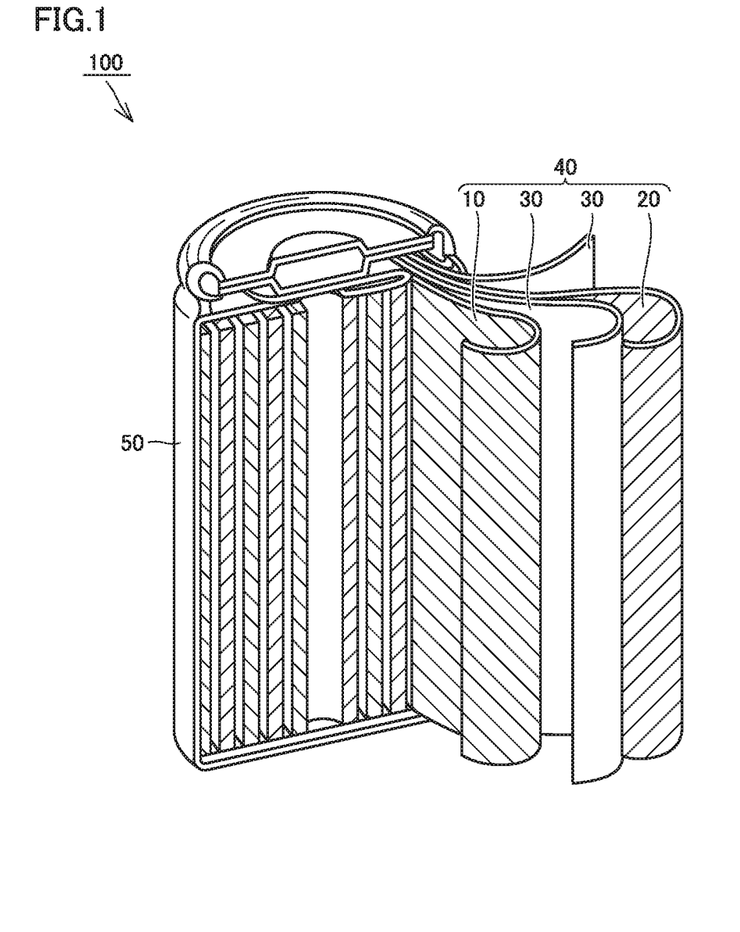
FIG. 1 is a schematic diagram showing one example of a construction of a battery in the present embodiment.

FIG. 1 is a schematic diagram showing one example of a construction of a battery in the present embodiment. A battery 100 includes a case 50. Case 50 is cylindrical. The case should not be limited to be cylindrical in the present embodiment. The case may be, for example, in a prismatic shape (a rectangular parallelepiped with a flat profile).

Case 50 is hermetically sealed. Case 50 may be made of iron (Fe), stainless steel, or an aluminum (Al) alloy. So long as case 50 is hermetically sealed, case 50 may be, for example, a pouch made of an Al-laminated film.

Case 50 accommodates an electrode group 40 and an electrolyte (not shown). Electrode group 40 includes a positive electrode 10, a negative electrode 20, and a separator 30. Battery 100 includes at least positive electrode 10, negative electrode 20, and the electrolyte.

Electrode group 40 is of a wound type. Electrode group 40 is formed by stacking positive electrode 10, separator 30, negative electrode 20, and separator 30 in this order and further spirally winding them. The electrode group in the present embodiment may be of a stack type. The stack type electrode group can be formed by alternately stacking the positive electrode and the negative electrode with the separator being interposed between the positive electrode and the negative electrode.

«Positive Electrode»

Positive electrode 10 is provided as a sheet in a form of a band. Positive electrode 10 may include, for example, a positive electrode current collector and a positive electrode composite material layer. The positive electrode current collector may be, for example, an Al foil. The positive electrode current collector may have a thickness, for example, from 5 to 50 μm.

A "thickness" of each feature herein can be measured, for example, with a micrometer. A thickness of each feature may be measured in a micrograph of a cross-section of each feature. A thickness can be measured at least three times. An arithmetic mean resulting from at least three times of measurement can be adopted as a measurement result.

The positive electrode composite material layer can be formed on a surface of the positive electrode current collector. The positive electrode composite material layer can be formed on both of a front surface and a rear surface of the positive electrode current collector. The positive electrode composite material layer may have a thickness, for example, from 10 to 100 μm. The positive electrode composite material layer can contain a positive electrode active material, a conductive material, and a binder. The positive electrode composite material layer may contain, for example, 80 to 98 mass % of positive electrode active material, 1 to 10 mass % of conductive material, and 1 to 10 mass % of binder.

The positive electrode active material in the present embodiment is a material into and from which lithium (Li) ions are electrochemically intercalated and deintercalated at a potential, for example, not lower than 3.0 V (vs. Li/Li$^+$) and not higher than 5.0 V (vs. Li/Li$^+$). "V (vs. Li/Li$^+$)" represents a potential when a standard electrode potential of Li is defined as the reference (0 V).

(First Positive Electrode Active Material and Second Positive Electrode Active Material)

The positive electrode active material in the present embodiment includes at least a first positive electrode active material and a second positive electrode active material. Positive electrode 10 contains at least the first positive electrode active material and the second positive electrode active material. The first positive electrode active material is expressed with a formula (I):

$$\text{LiNi}_a\text{Co}_b\text{Mn}_c\text{O}_2 \quad \text{(I).}$$

The second positive electrode active material is expressed with a formula (II):

$$\text{LiNi}_d\text{Co}_e\text{Mn}_f\text{O}_2 \quad \text{(II).}$$

In the present embodiment, in the formulae (I) and (II), a, b, c, d, e, and f satisfy relation of a>d, $0.4 \leq a \leq 0.6$, $0.2 \leq b \leq 0.5$, $0.1 \leq c \leq 0.2$, and $a+b+c=1.0$, and $0.2 \leq d \leq 0.5$, $0.1 \leq e \leq 0.2$, $0.4 \leq f \leq 0.6$, and $d++f=1$.

With coexistence of the first positive electrode active material and the second positive electrode active material, improvement in extremely-low-temperature output is expected.

Furthermore, in the present embodiment, improvement in extremely-low-temperature output is expected particularly in a low charged state (which may hereinafter be abbreviated as "low state of charge (SOC)"). Details of this mechanism are also unclear. It is estimated to relate to such tendency of a current that the current tends to flow in a relatively larger amount to the first positive electrode active material (Ni rich) relatively low in resistance in the low SOC. The "low SOC" can refer, for example, to a range of SOC from 10 to 30%.

d, e, and f may satisfy relation of $0.2 \leq d \leq 0.4$, $0.1 \leq e \leq 0.2$, $0.5 \leq f \leq 0.6$, and $d+e+f=1$.

So long as a, b, c, d, e, and f satisfy the relation above, the first positive electrode active material and the second positive electrode active material should not particularly be limited. The first positive electrode active material and the second positive electrode active material can have, for example, crystal structure of a lamellar rock salt type. The first positive electrode active material may be, for example, $LiNi_{0.6}Co_{0.2}Mn_{0.2}O_2$ or $LiNi_{0.4}Co_{0.5}Mn_{0.1}O_2$. The second positive electrode active material may be, for example, $LiNi_{0.2}Co_{0.2}Mn_{0.6}O_2$, $LiNi_{0.4}Co_{0.1}Mn_{0.5}O_2$, or $LiNi_{0.5}Co_{0.1}Mn_{0.4}O_2$.

The positive electrode in the present embodiment can also contain a positive electrode active material other than the first positive electrode active material and the second positive electrode active material so long as an effect of improvement in extremely-low-temperature output is not lost.

(Average Particle Size)

The first positive electrode active material and the second positive electrode active material can be particulate. The first positive electrode active material can have a first average particle size. The second positive electrode active material can have a second average particle size. The first average particle size and the second average particle size may be, for example, from 1 to 30 μm. The "average particle size" herein refers to a particle size at which a cumulative volume of particles from a finer side attains to 50% of the total volume of particles in a volume-based particle size distribution measured with a laser diffraction/scattering method. Such a particle size is also referred to as "D50." The second average particle size may be, for example, smaller than the first average particle size.

(Oil Absorption Number)

An "oil absorption number (unit: ml/100 g)" herein represents an amount of drop of dibutyl phthalate (DPB) at which mixing torque is maximized when DPB is dropped into 100 g of a powder material while the powder material is being mixed. For example, an oil absorption number measurement apparatus manufactured by Asahisouken (trade name "S-500") or a product equivalent thereto can be used for measurement. The oil absorption number can be measured at least three times. An arithmetic mean of at least three times can be adopted as a measurement result.

The oil absorption number of the positive electrode active material is an indicator which can show how much electrolyte solution can exist around the positive electrode active material in the battery, in the present embodiment, an oil absorption number of the first positive electrode active material is defined as a first oil absorption number. An oil absorption number of the second positive electrode active material is defined as a second oil absorption number. The first positive electrode active material has a first oil absorption number. The second positive electrode active material has a second oil absorption number.

The second oil absorption number may be greater than the first oil absorption number. Thus, improvement in thermal stability of the battery is expected. It may be because the electrolyte solution is distributed unevenly around the second positive electrode active material relatively high in thermal stability. The first oil absorption number and the second oil absorption number can be adjusted, for example, based on a firing condition or a crushing condition when the first positive electrode active material and the second positive electrode active material are synthesized.

A ratio of the second oil absorption number to the first oil absorption number (an oil absorption number ratio) is calculated by dividing the second oil absorption number by the first oil absorption number. In calculation of the oil absorption number ratio, two digits are defined as significant figures. Namely, a figure is rounded off to two digits. The oil absorption number ratio may be not lower than 1.1 and not higher than 2.1. With the oil absorption number ratio being not lower than 1.1, improvement in thermal stability of the battery is expected. With the oil absorption number ratio being not higher than 2.1, improvement in cycling performance of the battery is expected. The oil absorption number ratio may be not lower than 1.2. The oil absorption number ratio may be not higher than 1.9 and not higher than 1.8.

The first oil absorption number may be, for example, not smaller than 15.1 ml/100 g and not greater than 19.6 ml/100 g. The second oil absorption number may be, for example, not smaller than 19.3 ml/100 g, not smaller than 21.6 ml/100 g, not smaller than 23.5 ml/100 g or not smaller than 29.4 ml/100 g. The second oil absorption number may be, for example, not greater than 43.2 ml/100 g, not greater than 41.2 ml/100 g, or not greater than 37.2 ml/100 g.

(Mass Ratio)

The first positive electrode active material and the second positive electrode active material may satisfy relation in mass ratio, for example, of the first positive electrode active material:the second positive electrode active material=15:85 to 65:35.

The first positive electrode active material and the second positive electrode active material may satisfy relation in mass ratio of the first positive electrode active material:the second positive electrode active material=20:80 to 60:40. With 20 mass % or more of the first positive electrode active material with respect to a total of the first positive electrode active material and the second positive electrode active material, improvement in extremely-low-temperature output is expected. With 40 mass % or more of the second positive electrode active material with respect to the total of the first positive electrode active material and the second positive electrode active material, improvement in thermal stability and improvement in cycling performance are expected.

A conductive material can assist electron conduction in the positive electrode composite material layer. The conductive material should not particularly be limited. The conductive material may be, for example, acetylene black (AB), furnace black, vapor grown carbon fiber (VGCF), or flake graphite. A single type of conductive material may be used alone or two or more types of conductive materials may be used as being combined.

A binder can bind components in the positive electrode composite material layer and can bind the positive electrode composite material layer and the positive electrode current collector to each other. The binder should not particularly be limited either. The binder may be, for example, polyvinylidene difluoride (PVdF), polytetrafluoroethylene (PTFE), a vinylidene difluoride-hexafluoropropylene copolymer [poly(VDF-co-HFP)], carboxymethyl cellulose (CMC), or polyacrylic acid (PAA). A single type of binder may be used alone, or two or more types of binders may be used as being combined.

«Negative Electrode»

Negative electrode 20 is provided as a sheet in a form of a band. Negative electrode 20 may include, for example, a negative electrode current collector and a negative electrode composite material layer. The negative electrode current collector may be, for example, a copper (Cu) foil. The negative electrode current collector may have a thickness, for example, from 5 to 50 µm.

The negative electrode composite material layer can be formed on a surface of the negative electrode current collector. The negative electrode composite material layer can be formed on both of a front surface and a rear surface of the negative electrode current collector. The negative electrode composite material layer may have a thickness, for example, from 10 to 100 µm. The negative electrode composite material layer can contain a negative electrode active material and a binder. The negative electrode composite material layer may contain, for example, 90 to 99.5 mass % of negative electrode active material and 0.5 to 10 mass % of binder.

The negative electrode active material in the present embodiment is a material into and from which Li ions are electrochemically intercalated and deintercalated at a potential, for example, not lower than 0 V (vs. Li/Li$^+$) and lower than 3.0 V (vs. Li/Li$^+$). The negative electrode active material should not particularly be limited. The negative electrode active material may be, for example, graphite, soft carbon, hard carbon, silicon, silicon oxide, a silicon alloy, tin, or a tin alloy. Graphite may be natural graphite or artificial graphite. A single type of negative electrode active material may be used alone, or two or more types of negative electrode active materials may be used as being combined. The negative electrode active material can be particulate. The negative electrode active material may have an average particle size, for example, from 1 to 30 µm.

The binder should not particularly be limited either. The binder may be, for example, CMC, styrene-butadiene rubber (SBR), PAA, or PTFE. A single type of binder may be used alone, or two or more types of binders may be used as being combined.

«Separator»

Separator 30 is provided as a sheet in a form of a band. Separator 30 is interposed between positive electrode 10 and negative electrode 20. Separator 30 may have a thickness, for example, from 10 to 50 µm. Separator 30 is porous. Separator 30 can be made of an electrically insulating material. Separator 30 can be composed, for example, of polyethylene (PE) or polypropylene (PP).

Separator 30 may have a single-layered structure or a multi-layered structure. Separator 30 may be constructed only of a porous layer composed of PE. Separator 30 may be constructed, for example, by stacking a porous layer composed of PP, a porous layer composed of PE, and a porous layer composed of PP in this order. Separator 30 may include a heat-resistant layer on its surface. The heat-resistant layer is porous. The heat-resistant layer contains a heat-resistant material. The heat-resistant material may be, for example, inorganic compound particles such as alumina or a heat-resistant resin such as polyimide.

«Electrolyte»

The electrolyte in the present embodiment is typically an electrolyte solution (a liquid electrolyte). The electrolyte may include an electrolyte solution. The electrolyte in the present embodiment may include a gel electrolyte and a solid electrolyte.

The electrolyte solution contains a solvent and Li salt. The electrolyte solution may contain, for example, 0.5 to 2.0 mol/l of Li salt. The Li salt may be, for example, LiPF$_6$, LiBF$_4$, Li[N(FSO$_2$)$_2$], and Li[N(CF$_3$SO$_2$)$_2$]. A single type of Li salt may be used alone, or two or more types of Li salt may be used as being combined.

The solvent is aprotic. The solvent may be a mixed solvent of cyclic carbonate and chain carbonate. A ratio of mixing between cyclic carbonate and chain carbonate may be set, for example, to cyclic carbonate:chain carbonate=1:9 to 5:5 in volume ratio. Examples of cyclic carbonate include ethylene carbonate (EC), propylene carbonate (PC), butylene carbonate (BC), and fluoroethylene carbonate (FEC). Examples of chain carbonate include dimethyl carbonate (DMC), ethyl methyl carbonate (EMC), and diethyl carbonate (DEC). For each of cyclic carbonate and chain carbonate, a single type may be used alone or two or more types may be used as being combined.

The solvent may include, for example, lactone, cyclic ether, chain ether, and carboxylate. Examples of lactone include γ-butyrolactone (GBL) and δ-valerolactone. Examples of cyclic ether include tetrahydrofuran (THF), 1,3-dioxolane, and 1,4-dioxane. Examples of chain ether include 1,2-dimethoxyethane (DME). Examples of carboxylate include methyl formate (MF), methyl acetate (MA), and methyl propionate (MP).

The electrolyte solution can contain various functional additives in addition to the solvent and the Li salt. The electrolyte solution may contain, for example, 1 to 5 mass % of functional additive. Examples of the functional additive include a gas generating agent (an overcharge additive) and a film forming agent. Examples of the gas generating agent include cyclohexylbenzene (CHB) and biphenyl (BP). Examples of the film forming agent include vinylene carbonate (VC), vinyl ethylene carbonate (VEC), Li[B(C$_2$O$_4$)$_2$], LiPO$_2$F$_2$, propane sultone (PS), and ethylene sulfite (ES).

<Method of Manufacturing Lithium Ion Secondary Battery>

Figure 2:
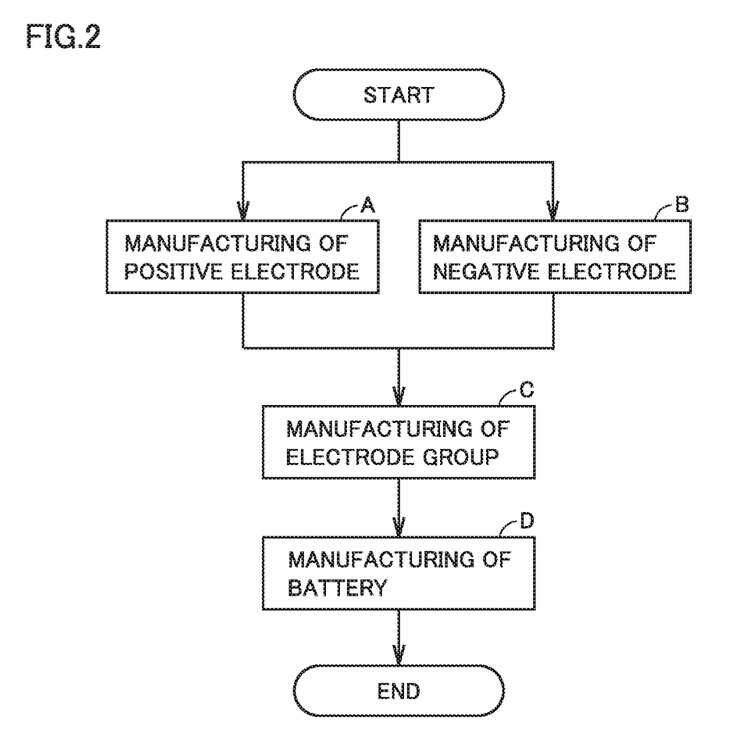
FIG. 2 is a flowchart showing overview of a method of manufacturing a battery in the present embodiment.

Battery 100 can be manufactured, for example, with a manufacturing method below.

FIG. 2 is a flowchart showing overview of a method of manufacturing a battery in the present embodiment. The method of manufacturing a battery in the present embodiment includes "(A) manufacturing of positive electrode," "(B) manufacturing of negative electrode," "(C) manufacturing of electrode group," and "(D) manufacturing of battery." The method of manufacturing a battery in the present embodiment includes "(A) manufacturing of positive electrode" and "(D) manufacturing of battery." Any of "(A) manufacturing of positive electrode" and "(B) manufacturing of negative electrode" may be performed first.

«(A) Manufacturing of Positive Electrode»

The method of manufacturing a battery in the present embodiment includes manufacturing positive electrode 10. Positive electrode 10 is manufactured to contain at least the first positive electrode active material and the second positive electrode active material.

For example, initially, positive electrode composite material slurry can be prepared by mixing the first positive electrode active material, the second positive electrode active material, the conductive material, the binder, and the solvent. A general agitator (for example, a planetary mixer) can be used for a mixing operation. Before preparation of slurry, the first positive electrode active material and the second positive electrode active material may be mixed in a powder state. Details of the first positive electrode active material and the second positive electrode active material are as described previously.

The first positive electrode active material is expressed with a formula (I):

$$LiNi_aCo_bMn_cO_2 \quad (I).$$

The second positive electrode active material is expressed with a formula (II):

$$LiNi_dCo_eMn_fO_2 \quad (II).$$

In the formulae (I) and (II), a, b, c, d, e, and f satisfy relation of
a>d,
0.4≤a≤0.6, 0.2≤b≤0.5, 0.1≤c≤0.2, and a+b+c=1.0, and
0.2≤d≤0.5, 0.1≤e≤0.2, 0.4≤f≤0.6, and d+e+f=1.

The first positive electrode active material may be, for example, $LiNi_{0.6}Co_{0.2}Mn_{0.2}O_2$ or $LiNi_{0.4}Co_{0.5}Mn_{0.1}O_2$. The second positive electrode active material may be, for example, $LiNi_{0.2}Co_{0.2}Mn_{0.6}O_2$, $LiNi_{0.4}Co_{0.1}Mn_{0.5}O_2$, or $LiNi_{0.5}Co_{0.1}Mn_{0.4}O_2$.

The second oil absorption number (the oil absorption number of the second positive electrode active material) may be greater than the first oil absorption number (the oil absorption number of the first positive electrode active material). The oil absorption number ratio (=the second oil absorption number÷the first oil absorption number) may be not lower than 1.1 and not higher than 2.1. The first positive electrode active material and the second positive electrode active material may be mixed to satisfy relation in mass ratio of the first positive electrode active material:the second positive electrode active material 20:80 to 60:40.

Details of the conductive material and the binder are as described previously. A solvent can be selected as appropriate depending on a type of a binder. For example, when PVdF is selected as the binder, N-methyl-2-pyrrolidone (NMP) can be selected as the solvent.

A positive electrode composite material layer can be formed by coating the surface of the positive electrode current collector with the positive electrode composite material slurry and drying the slurry. Details of the positive electrode current collector are as described previously. A general coater (for example, a die coater) can be used for a coating operation. A general drying method (hot air or infrared rays) can be used for a drying Operation. The positive electrode composite material layer may be compressed after the positive electrode composite material layer is dried. A general compressor (for example, a roller) can be used for a compressing operation.

Positive electrode 10 can be manufactured as above. Positive electrode 10 can be used as being cut into a prescribed shape in conformity with specifications of battery 100. Positive electrode 10 can be cut, for example, into a form of a band.

«(B) Manufacturing of Negative Electrode»

The method of manufacturing a battery in the present embodiment can include manufacturing negative electrode 20. The method of manufacturing negative electrode 20 should not particularly be limited. Negative electrode 20 can be manufactured with a conventionally known manufacturing method.

For example, initially, negative electrode composite material slurry can be prepared by mixing the negative electrode active material, the binder, and the solvent. A general agitator can be used for a mixing operation. Details of each material are as described previously. A solvent can be selected as appropriate depending on a type of a binder. For example, when CMC and SBR are selected as the binder, water can be selected as the solvent.

A negative electrode composite material layer can be formed by coating the surface of the negative electrode current collector with the negative electrode composite material slurry and drying the slurry. Details of the negative electrode current collector are as described previously. A general coater can be used for a coating operation. A general drying method can be used for a drying operation. The negative electrode composite material layer may be compressed after the negative electrode composite material layer is dried. A general compressor can be used for a compressing operation.

Negative electrode 20 can be manufactured as above. Negative electrode 20 can be used as being cut into a prescribed shape in conformity with specifications of battery 100. Negative electrode 20 can be cut, for example, into a form of a band.

«(C) Manufacturing of Electrode Group»

The method of manufacturing a battery in the present embodiment can include manufacturing of electrode group 40. Electrode group 40 can be manufactured to include positive electrode 10, negative electrode 20, and separator 30. Electrode group 40 can be manufactured, for example, by stacking positive electrode 10, separator 30, negative electrode 20, and separator 30 in this order and spirally winding them. Details of separator 30 are as described previously.

«(D) Manufacturing of Battery»

The method of manufacturing a battery in the present embodiment includes manufacturing battery 100 including at least positive electrode 10, negative electrode 20, and the electrolyte.

Case 50 is prepared. Electrode group 40 is accommodated in case 50. Positive electrode 10 is electrically connected to a portion of case 50 to serve as a positive electrode terminal. Negative electrode 20 is electrically connected to a portion of case 50 to serve as a negative electrode terminal. The electrolyte is accommodated in case 50. Details of the electrolyte are as described previously. When an electrolyte solution is employed as the electrolyte, the electrolyte solution is injected into case 50 so that electrode group 40 is impregnated with the electrolyte solution. Case 50 is hermetically sealed.

Battery 100 can be manufactured as above. According to the method of manufacturing a battery in the present embodiment, improvement in extremely-low-temperature output is expected.

<Applications>

The battery in the present embodiment is expected to exhibit excellent extremely-low-temperature output. Applications in which importance is placed on extremely-low-temperature output include, for example, a power supply for driving for a hybrid vehicle (HV), a plug-in hybrid vehicle (PHV), an electric vehicle (EV), and the like. Applications of the battery in the present embodiment should not be limited to the power supply for driving for vehicles. The battery in the present embodiment can be applied to each and every application.

EXAMPLES

Examples of the present disclosure wilt be described below. The description below does not limit the scope of claims for patent.

<Manufacturing of Lithium Ion Secondary Battery>

Samples 1-1 to 1-22 and samples 2-1 to 2-10 were manufactured as below. In the present disclosure, samples 1-1 to 1-22 represent Examples. Samples 2-1 to 2-10 represent Comparative Examples.

<Manufacturing of Sample 1-1>

«(A) Manufacturing of Positive Electrode»

Materials below were prepared.

First positive electrode active material: $LiNi_{0.6}Co_{0.2}Mn_{0.2}O_2$ (oil absorption number of 19.6 ml/100 g)

Second positive electrode active material: $LiNi_{0.2}Co_{0.2}Mn_{0.6}O_2$ (oil absorption number of 35.3 ml/100 g)

Conductive material: AB
Binder: PVdF
Solvent: NMP
Positive electrode current collector: Al foil (thickness of 15 μm)

The oil absorption number of each of the first positive electrode active material and the second positive electrode active material was measured with an oil absorption number measurement apparatus (trade name "S-500") manufactured by Asahisouken. (which is also applicable to samples other than sample 1-1).

The first positive electrode active material (powders) and the second positive electrode active material (powders) were mixed at a mass ratio of the first positive electrode active material:the second positive electrode active material=15:85. The positive electrode active material was thus prepared. Positive electrode composite material slurry was prepared by mixing the positive electrode active material, the conductive material, the binder, and the solvent. A solid composition of the positive electrode composite material slurry was set to a mass ratio of the positive electrode active material:the conductive material:the binder=93:4:3.

A positive electrode composite material layer was formed by coating surfaces (both of the front and rear surfaces) of the positive electrode current collector with the positive electrode composite material slurry and drying the slurry. An amount of coating was adjusted such that it was set to 40 mg/cm² after drying. The positive electrode composite material layer was compressed to have a thickness of 150 μm in total on both surfaces (a thickness of 75 μm on one surface). Positive electrode 10 was thus manufactured. Positive electrode 10 was cut into a form of a band.

Positive electrode 10 was manufactured to contain at least the first positive electrode active material and the second positive electrode active material as set forth above.

«(B) Manufacturing of Negative Electrode»

Materials below were prepared.

Negative electrode active material: natural graphite (average particle size of 10 μm)

Binder: CMC and SBR
Solvent: water
Negative electrode current collector: Cu foil (thickness of 10 μm)

Negative electrode composite material slurry was prepared by mixing the negative electrode active material, the binder, and the solvent. A solid composition of the negative electrode composite material slurry was set to a mass ratio of the negative electrode active material:the binder=98:2. SBR and CMC were prepared in equal proportions.

A negative electrode composite material layer was formed by coating surfaces (both of the from and rear surfaces) of the negative electrode current collector with the negative electrode composite material slurry and drying the slurry. An amount of coating was adjusted such that it was set to 19 mg/cm² after drying. The negative electrode composite material layer was compressed to have a thickness of 150 μm in total on both surfaces (a thickness of 75 μm on one surface). Negative electrode 20 was thus manufactured. Negative electrode 20 was cut into a form of a band.

A lead terminal was attached to each of positive electrode 10 and negative electrode 20. Separator 30 in a form of a band (composed of PE) was prepared. Positive electrode 10, separator 30, negative electrode 20, and separator 30 were stacked in this order and spirally wound. Electrode group 40 was thus manufactured.

Cylindrical case 50 was prepared. Case 50 had a 18650 size (a diameter of 18 mm and a height of 65 mm). Electrode group 40 was accommodated in case 50. An electrolyte was injected into case 50. An electrolyte solution containing a solvent and Li salt was employed as the electrolyte. A composition of the solvent and Li salt are as follows.

Composition of solvent: [EC:EMC:DMC=3:4:3 (volume ratio)]

Li salt: $LiPF_6$ (1 mol/l)

After the electrolyte was injected, case 50 was hermetically sealed. A cylindrical lithium ion secondary battery (sample 1-1) was manufactured as above. This battery is designed to have a rated capacity of 1.3 Ah in a range of voltages from 3.0 to 4.1 V.

<Samples 1-2 to 1-22>

The batteries were manufactured similarly to sample 1-1 except for use of the first positive electrode active materials and the second positive electrode active materials shown in Table 1. In samples 1-3 to 1-9, an oil absorption number of the positive electrode active material was adjusted depending on a firing condition at the time of synthesis:

<Samples 2-1 to 2-8>

The batteries were manufactured similarly to sample 1-1 except for use of the first positive electrode active materials alone shown in Table 2.

<Samples 2-9 and 2-10>

The batteries were manufactured similarly to sample 1-3 except for use of the first positive electrode active materials and the second positive electrode active materials shown in Table 2.

<Evaluation>

«Extremely-Low-Temperature Output»

Extremely-low-temperature output was evaluated based on direct-current (DC) discharging at an extremely low temperature and a low SOC.

An SOC of battery 100 was adjusted to 25%. Initially, battery 100 was placed in a thermostatic chamber set to a low temperature (−30° C.). Battery 100 was discharged for two seconds under a current of 3.9 A. An amount of lowering in voltage two seconds after the start of discharging was measured. By dividing the amount of lowering in voltage by the current, a DC resistance at −30° C. was calculated. Tables 1 and 2 show results.

Then, a set temperature of the thermostatic chamber was changed to an extremely low temperature (−35° C.). Except for this change, an amount of lowering in voltage was measured and a DC resistance at −35° C. was measured as above. Tables 1 and 2 show results. It is understood that extremely-low-temperature output is better as a value (DC resistance) in the field of "extremely low temperature (−35° C.)" is smaller in Tables 1 and 2.

«Thermal Stability»

Thermal stability was evaluated based on differential scanning calorimetry (DSC).

Battery 100 was charged to 4.4 V (an overcharged state). After charging, battery 100 was disassembled and positive electrode 10 was collected. An annular sample was taken out of positive electrode 10 by punching. The annular sample had a diameter of 3 mm. In a glove box set to an argon atmosphere, 1 μg of electrolyte solution and the annular sample were sealed in a prescribed pan. A heat generation start temperature was measured with a DSC apparatus (product name "Q1000" manufactured by TA Instruments). A rate of increase in temperature was set to 10° C./min. Tables 1 and 2 show results. It is understood that thermal stability is better as a heat generation start temperature is higher in Tables 1 and 2.

«Cycling Performance»

Cycling performance was evaluated based on charging and discharging cycles in a high-temperature environment.

Battery 100 was placed in a thermostatic chamber set to 60° C. Five hundred charging and discharging cycles were repeated under a current of 2.6 A in a range of voltages from 3.0 to 4.1 V. A capacity retention was calculated by dividing a discharged capacity in the 500th cycle by a discharged capacity in the first cycle. Tables 1 and 2 show results. It is understood that cycling performance is better as the capacity retention is higher in Tables 1 and 2.

TABLE 1

List of Samples (No. 1)

| | Positive Electrode | | | | | | | | | | Evaluation | | | |
|---|---|---|---|---|---|---|---|---|---|---|---|---|---|---|
| | First Positive Electrode Active Material | | | | Second Positive Electrode Active Material | | | | | | Output | | Thermal Stability | |
| | $LiNi_aCo_bMn_cO_2$ | | | First Oil Absorption Number | $LiNi_dCo_eMn_fO_2$ | | | Second Oil Absorption Number | Oil Absorption Number Ratio | Mass Ratio (Mixing Ratio) | Low Temperature (−30° C.) SOC 25% | Extremely Low Temperature (−35° C.) SOC 25% | DSC Heat Generation Start Temperature | Cycling Performance Capacity Retention |
| Sample | a | b | c | [ml/100 g] | d | e | f | [ml/100 g] | Ratio | | [mΩ] | [mΩ] | [° C.] | [%] |
| 1-1 | 0.6 | 0.2 | 0.2 | 19.6 | 0.2 | 0.2 | 0.6 | 35.3 | 1.8 | 15:85 | 382 | 429 | 259 | 82.5 |
| 1-2 | 0.6 | 0.2 | 0.2 | 19.6 | 0.2 | 0.2 | 0.6 | 35.3 | 1.8 | 20:80 | 375 | 398 | 258 | 81.6 |
| 1-3 | 0.6 | 0.2 | 0.2 | 19.6 | 0.2 | 0.2 | 0.6 | 19.3 | 1.0 | 50:50 | 429 | 678 | 224 | 86.3 |
| 1-4 | 0.6 | 0.2 | 0.2 | 19.6 | 0.2 | 0.2 | 0.6 | 21.6 | 1.1 | 50:50 | 411 | 602 | 246 | 85.6 |
| 1-5 | 0.6 | 0.2 | 0.2 | 19.6 | 0.2 | 0.2 | 0.6 | 23.5 | 1.2 | 50:50 | 379 | 525 | 248 | 85.5 |
| 1-6 | 0.6 | 0.2 | 0.2 | 19.6 | 0.2 | 0.2 | 0.6 | 29.4 | 1.8 | 50:50 | 352 | 376 | 252 | 83.2 |
| 1-7 | 0.6 | 0.2 | 0.2 | 19.6 | 0.2 | 0.2 | 0.6 | 37.2 | 1.9 | 50:50 | 349 | 372 | 250 | 80.8 |
| 1-8 | 0.6 | 0.2 | 0.2 | 19.6 | 0.2 | 0.2 | 0.6 | 41.2 | 2.1 | 50:50 | 343 | 363 | 245 | 76.9 |
| 1-9 | 0.6 | 0.2 | 0.2 | 19.6 | 0.2 | 0.2 | 0.6 | 43.2 | 2.2 | 50:50 | 339 | 361 | 242 | 53.4 |
| 1-10 | 0.6 | 0.2 | 0.2 | 19.6 | 0.2 | 0.2 | 0.6 | 35.2 | 1.8 | 60:40 | 341 | 369 | 250 | 80.2 |
| 1-11 | 0.6 | 0.2 | 0.2 | 19.6 | 0.2 | 0.2 | 0.6 | 35.3 | 1.8 | 65:35 | 353 | 376 | 248 | 78.5 |
| 1-12 | 0.6 | 0.2 | 0.2 | 19.6 | 0.4 | 0.1 | 0.5 | 28.9 | 1.5 | 15:85 | 318 | 424 | 239 | 84.4 |
| 1-13 | 0.6 | 0.2 | 0.2 | 19.6 | 0.4 | 0.1 | 0.5 | 28.9 | 1.5 | 20:80 | 305 | 412 | 245 | 83.2 |
| 1-14 | 0.6 | 0.2 | 0.2 | 19.6 | 0.4 | 0.1 | 0.5 | 28.9 | 1.5 | 50:50 | 296 | 405 | 252 | 82.5 |
| 1-15 | 0.6 | 0.2 | 0.2 | 19.6 | 0.4 | 0.1 | 0.5 | 28.9 | 1.5 | 60:40 | 283 | 389 | 249 | 81.5 |
| 1-16 | 0.6 | 0.2 | 0.2 | 19.6 | 0.4 | 0.1 | 0.5 | 28.9 | 1.5 | 65:35 | 284 | 392 | 245 | 80.6 |
| 1-17 | 0.6 | 0.2 | 0.2 | 19.6 | 0.5 | 0.1 | 0.4 | 30.1 | 1.5 | 15:85 | 345 | 391 | 245 | 82.7 |
| 1-18 | 0.6 | 0.2 | 0.2 | 19.6 | 0.5 | 0.1 | 0.4 | 30.1 | 1.5 | 20:80 | 341 | 385 | 243 | 81.7 |
| 1-19 | 0.6 | 0.2 | 0.2 | 19.6 | 0.5 | 0.1 | 0.4 | 30.1 | 1.5 | 50:50 | 334 | 383 | 242 | 80.5 |
| 1-20 | 0.6 | 0.2 | 0.2 | 19.6 | 0.5 | 0.1 | 0.4 | 30.1 | 1.5 | 60:40 | 338 | 378 | 240 | 78.7 |
| 1-21 | 0.6 | 0.2 | 0.2 | 19.6 | 0.5 | 0.1 | 0.4 | 30.1 | 1.5 | 65:35 | 336 | 377 | 236 | 76.7 |
| 1-22 | 0.4 | 0.5 | 0.1 | 15.1 | 0.2 | 0.2 | 0.6 | 29.4 | 1.9 | 50:50 | 494 | 796 | 264 | 83.8 |

TABLE 2

List of Samples (No. 2)

| | Positive Electrode | | | | | | | | | Evaluation | | | |
| | First Positive Electrode Active Material | | | | Second Positive Electrode Active Material | | | | | Output | | Thermal Stability DSC Heat Generation Start Temperature | Cycling Performance Capacity Retention |
| | $LiNi_aCo_bMn_cO_2$ | | | First Oil Absorption Number | $LiNi_dCo_eMn_fO_2$ | | | Second Oil Absorption Number | Oil Absorption Number Ratio | Mass Ratio (Mixing Ratio) | Low Temperature (−30° C.) SOC 25% | Extremely Low Temperature (−35° C.) SOC 25% | | |
| Sample | a | b | c | [ml/100 g] | d | e | f | [ml/100 g] | Ratio | Ratio | [mΩ] | [mΩ] | [° C.] | [%] |
|---|---|---|---|---|---|---|---|---|---|---|---|---|---|---|
| 2-1 | 0.6 | 0.2 | 0.2 | 19.6 | — | — | — | — | — | 100:0 | 637 | 885 | 189 | 78.8 |
| 2-2 | 0.2 | 0.2 | 0.6 | 21.6 | — | — | — | — | — | 100:0 | 1028 | 1885 | 326 | 85.3 |
| 2-3 | 0.2 | 0.2 | 0.6 | 23.5 | — | — | — | — | — | 100:0 | 964 | 1682 | 325 | 84.8 |
| 2-4 | 0.2 | 0.2 | 0.6 | 29.4 | — | — | — | — | — | 100:0 | 917 | 1597 | 325 | 83.5 |
| 2-5 | 0.2 | 0.2 | 0.6 | 37.2 | — | — | — | — | — | 100:0 | 876 | 1492 | 322 | 82.3 |
| 2-6 | 0.2 | 0.2 | 0.6 | 41.2 | — | — | — | — | — | 100:0 | 853 | 1424 | 315 | 81.5 |
| 2-7 | 0.4 | 0.1 | 0.5 | 28.9 | — | — | — | — | — | 100:0 | 690 | 1067 | 278 | 86.8 |
| 2-8 | 0.5 | 0.1 | 0.4 | 30.1 | — | — | — | — | — | 100:0 | 724 | 989 | 284 | 82.3 |
| 2-9 | 0.4 | 0.2 | 0.4 | 14.9 | 0.4 | 0.5 | 0.1 | 15.1 | 1.0 | 50:50 | 455 | 878 | 269 | 86.6 |
| 2-10 | 0.4 | 0.5 | 0.1 | 15.1 | 1/3 | 1/3 | 1/3 | 16.6 | 1.1 | 50:50 | 421 | 1022 | 274 | 86.1 |

<Results>

«First Positive Electrode Active Material and Second Positive Electrode Active Material»

As shown in Tables 1 and 2, the samples in which the positive electrode contains the first positive electrode active material ($LiNi_aCo_bMn_cO_2$) and the second positive electrode active material ($LiNi_dCo_eMn_fO_2$) and a, b, c, d, e, and f satisfy relation below have achieved improved extremely-low-temperature output (that is, a low resistance):

a>d, $0.4 \leq a \leq 0.6$, $0.2 \leq b \leq 0.5$, $0.1 \leq c \leq 0.2$, and a+b+c=1.0, and $0.2 \leq d \leq 0.5$, $0.1 \leq e \leq 0.2$, $0.4 \leq f \leq 0.6$, and d+e+f=1.

An effect of improvement in output appears at an extremely low temperature (−35° C.) more significantly than at a low temperature (−30° C.).

In samples 1-1 to 1-22 (samples which have achieved improved extremely-low-temperature output) in Table 1, the first positive electrode active material is $LiNi_{0.6}Co_{0.2}Mn_{0.2}O_2$ or $LiNi_{0.4}Co_{0.5}Mn_{0.1}O_2$, and the second positive electrode active material is $LiNi_{0.2}Co_{0.2}Mn_{0.6}O_2$, $LiNi_{0.4}Co_{0.1}Mn_{0.5}O_2$, or $LiNi_{0.5}Co_{0.1}Mn_{0.4}O_2$.

«Oil Absorption Number»

It is found based on the results of samples 1-3 to 1-9 in Table 1 that a sample in which the second oil absorption number is greater than the first oil absorption number tends to achieve improved thermal stability (that is, tends to achieve a higher heat generation start temperature). It is assumed that the electrolyte solution is distributed unevenly around the second positive electrode active material relatively high in thermal stability in the positive electrode.

It is found based on the results of samples 1-3 to 1-9 in Table 1 that a sample in which the oil absorption number ratio is not lower than 1.1 tends to achieve improved thermal stability (that is, tends to achieve a higher heat generation start temperature). The sample of which oil absorption number ratio is not higher than 2.1 is found to tend to achieve improved cycling performance (that is, tend to be high in capacity retention).

«Mass Ratio»

It is found based on the results of samples 1-1, 1-2, 1-10, 1-11, 1-12 to 1-16, and 1-17 to 1-21 in Table 1 that the samples in which a ratio of the first positive electrode active material is 20 mass % or more with respect to the total of the first positive electrode active material and the second positive electrode active material tend to achieve improved extremely-low-temperature output (that is, tend to be low in resistance). It is found that the samples in which a ratio of the second positive electrode active material is 40 mass % or more with respect to the total of first positive electrode active material and the second positive electrode active material tend to achieve improved thermal stability (that is, tends to achieve a higher heat generation start temperature) and improved cycling performance (that is, tend to be high in capacity retention). Therefore, the first positive electrode active material and the second positive electrode active material may satisfy relation in mass ratio of the first positive electrode active material:the second positive electrode active material=20:80 to 60:40.

It should be understood that the embodiment disclosed herein is illustrative and non-restrictive in every respect. The technical scope defined by the terms of the claims is intended to include any modifications within the scope and meaning equivalent to the terms of the claims.

What is claimed is:

1. A lithium ion secondary battery comprising at least:
   a positive electrode;
   a negative electrode; and
   an electrolyte,
   the positive electrode containing at least a first positive electrode active material and a second positive electrode active material,
   the electrolyte includes an electrolyte solution,
   the first positive electrode active material has a first oil absorption number,
   the second positive electrode active material has a second oil absorption number,
   the second oil absorption number is greater than the first oil absorption number,
   a ratio of the second oil absorption number to the first oil absorption number is not lower than 1.1 and not higher than 2.1,
   the first positive electrode active material being expressed with a formula (I):

$LiNi_aCo_bMn_cO_2$  (I), and the second positive electrode active material being expressed with a formula (II):

$$LiNi_dCo_eMn_fO_2 \quad (II),\text{ where}$$

a, b, c, d, e, and f satisfy conditions of
a>d,
0.4≤a≤0.6, 0.2≤b≤0.5, 0.1≤c≤0.2, and a+b+c=1.0, and
0.2≤d≤0.5, 0.5, 0.1≤e≤0.2, 0.4≤f≤0.6, and d+e+f=1.

2. The lithium ion secondary battery according to claim 1, wherein
the first positive electrode active material is $LiNi_{0.6}Co_{0.2}Mn_{0.2}O_2$ or $LiNi_{0.4}Co_{0.5}Mn_{0.1}O_2$, and
the second positive electrode active material is $LiNi_{0.2}Co_{0.2}Mn_{0.6}O_2$, $LiNi_{0.4}Co_{0.1}Mn_{0.5}O_2$, or $LiNi_{0.5}Co_{0.1}Mn_{0.4}O_2$.

3. The lithium ion secondary battery according to claim 1, wherein
the first positive electrode active material and the second positive electrode active material satisfy relation in mass ratio of the first positive electrode active material: the second positive electrode active material=20:80 to 60:40.

4. The lithium ion secondary battery according to claim 1, wherein 0.5≤a≤0.6.

5. The lithium ion secondary battery according to claim 1, wherein 0.5≤a≤0.6.

6. A method of manufacturing a lithium ion secondary battery comprising:
manufacturing a positive electrode; and
manufacturing a lithium ion secondary battery including at least the positive electrode, a negative electrode, and an electrolyte,
the positive electrode being manufactured to contain at least a first positive electrode active material and a second positive electrode active material,
the electrolyte includes an electrolyte solution,
the first positive electrode active material has a first oil absorption number,
the second positive electrode active material has a second oil absorption number,
the second oil absorption number is greater than the first oil absorption number,
a ratio of the second oil absorption number to the first oil absorption number is not lower than 1.1 and not higher than 2.1,
the first positive electrode active material being expressed with a formula (I):

$$LiNi_aCo_bMn_cO_2 \quad (I),\text{ and}$$

the second positive electrode active material being expressed with a formula (II):

$$LiNi_dCo_eMn_fO_2 \quad (II),\text{ where}$$

a, b, c, d, e, and f satisfy conditions of
a>d,
0.4≤a≤0.6, 0.2≤b≤0.5, 0.1≤c≤0.2, and a+b+c=1.0, and
0.2≤d≤0.5, 0.5, 0.1≤e≤0.2, 0.4≤f≤0.6, and d+e+f=1.

7. The method of manufacturing a lithium ion secondary battery according to claim 6, wherein
the first positive electrode active material is $LiNi_{0.6}Co_{0.2}Mn_{0.2}O_2$ or $LiNi_{0.4}Co_{0.5}Mn_{0.1}O_2$, and
the second positive electrode active material is $LiNi_{0.2}Co_{0.2}Mn_{0.6}O_2$, $LiNi_{0.4}Co_{0.1}Mn_{0.5}O_2$, or $LiNi_{0.5}Co_{0.1}Mn_{0.4}O_2$.

8. The method of manufacturing a lithium ion secondary battery according to claim 6, wherein
the first positive electrode active material and the second positive electrode active material satisfy relation in mass ratio of the first positive electrode active material: the second positive electrode active material=20:80 to 60:40.

9. The method of manufacturing a lithium ion secondary battery according to claim 6, wherein 0.5≤a≤0.6.

10. The method of manufacturing a lithium ion secondary battery according to claim 6, wherein 0.5<a≤0.6.

* * * * *